M. ADAMSKI.
GROUND GRIPPING DEVICE FOR VEHICLE WHEELS.
APPLICATION FILED APR. 2, 1917.
1,298,149.
Patented Mar. 25, 1919.
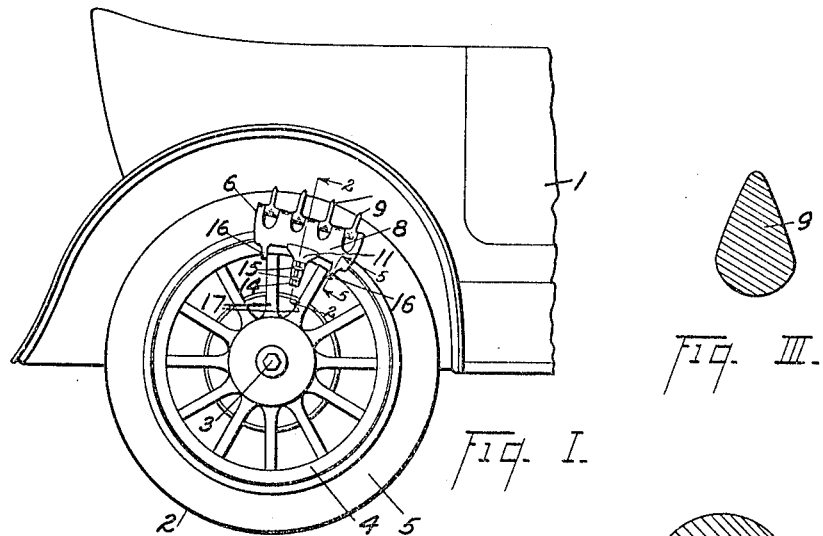
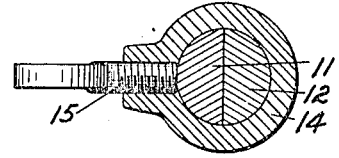
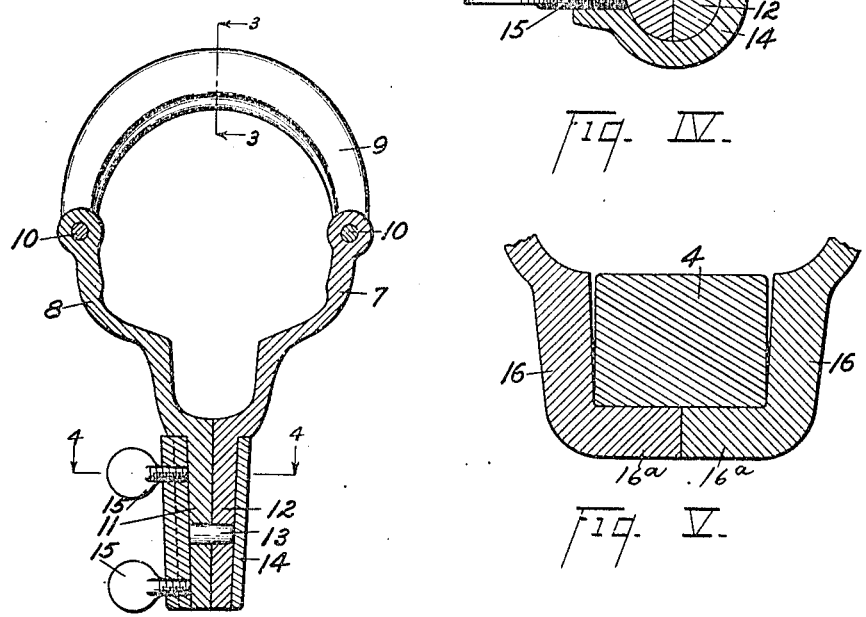
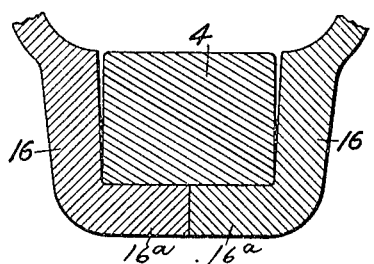
Michael Adamski, Inventor
By Ralph J. Burton, Attorney

UNITED STATES PATENT OFFICE.

MICHAEL ADAMSKI, OF DETROIT, MICHIGAN.

GROUND-GRIPPING DEVICE FOR VEHICLE-WHEELS.

1,298,149.  Specification of Letters Patent.  Patented Mar. 25, 1919.

Application filed April 2, 1917. Serial No. 159,321.

*To all whom it may concern:*

Be it known that I, MICHAEL ADAMSKI, a subject of the Emperor of Germany, and resident of Detroit, in the county of Wayne, State of Michigan, have invented certain new and useful Improvements in Ground-Gripping Devices for Vehicle-Wheels, of which the following is a specification, reference being had therein to the accompanying drawings.

This invention relates to ground gripping devices for vehicle wheels, and is particularly adapted and intended for attachment to the wheel or wheels of an automobile, the primary object being to provide an easily attachable ground gripping device for emergency use, which will effectively prevent slipping or spinning of the wheel or wheels on slushy, muddy or slippery ground, and enable the same to exert driving power in ruts or muddy holes in the road.

A further object is to provide an easily attachable ground gripping device for use on the wheel or wheels of an automobile, and which will so firmly grip the road bed as to enable the car to pull itself out of a muddy hole or rut in the road.

A further object is to provide a ground gripping device for attachment to the wheel or wheels of an automobile, which can be quickly applied and removed, and which will so effectively increase the tractional effort and driving power of the wheel or wheels as to cause the same to grip and hold to the bed of the road even under the most slushy and muddy road conditions, and exert full driving power.

A further object is to provide a ground gripping device of cheap and simple construction which can be readily attached to the wheel or wheels of an automobile when needed, and as quickly removed therefrom.

With these and other objects in view, the invention resides in the novel construction, combination and arrangement of parts to be hereinafter specifically described and then claimed.

In the drawings, Figure I is an elevation of the driving wheel of an automobile showing my device in position. Fig. II is a cross sectional view of the device taken on line 2—2 of Fig. I. Fig. III is a cross sectional view of gripping member 9, taken on line 3—3 of Fig. II. Fig. IV is a cross sectional view of side extensions 11 and 12 and enveloping sleeve 14, and shows also the application of thumb screw 15, and is taken on line 4—4 of Fig. II. Fig. V is a cross sectional view taken on line 5—5 of Fig. I showing the means whereby the device is locked to the felly of the wheel.

Like characters of reference designate similar parts throughout the different figures of the drawings.

In the drawings, 1 represents a body of an automobile, 2 a driving wheel mounted on an axis 3 and having spokes 17, a felly 4 and a pneumatic tire 5, all shown conventionally.

Figure I shows the complete gripping device mounted and locked on the wheel, said gripping device being constructed with side gripping portions 7 and 8, having arms 16 formed with meeting flanges 16ᵃ on their extremities (Fig. V), which arms are formed on the ends of inner margins of the side portions, said side portions being shaped and adapted to fit over the sides of a felly 4 and overlap the tire 5, the arms 16 being spaced apart on each side portion and adapted to span a plurality of spokes 17 and engage extreme points thereon, thus holding the device firmly in position on a tire as illustrated. The side portions 7 and 8 are formed with mating, centrally-located, arms or extensions 11, 12, which are semi-circular in cross-section and tapering longitudinally (Fig. II) and said arms or extensions are clamped and held firmly together or toward each other by means of a sleeve 14, which sleeve fits over said arms and is adjustable throughout the length thereof. A pin 13 is mounted through the arms 11, 12, or, said pin might and preferably would be permanently embedded in one of said arms, the other arm being formed with a hole adapted to receive it, whereby they are retained in intimate relation prior to the placing of the sleeve thereon. The sleeve 14 is held in its enveloping relation and adjusted position on the arms or extensions 11 and 12, of the side portions 7 and 8, by means of hand-operated set screws, or thumb-screws, 15, which are threaded through a thickened portion of the wall of the sleeve, and are adapted selectively to engage the arms. It is deemed advisable to strengthen that portion of the sleeve 14 which carries the screws 15, by thickening the wall as shown. The side portions 7 and 8, as well as the arms 16 and flanges 16ᵃ, are shaped and adapted to fit snugly over the selected size and shape of tire and rim or felly on which the same are used. The side portions 7 and 8, the extensions or arms 11 and 12, the pin 13, the sleeve 14 and screws 15 would be constructed of a material, preferably cast metal, found best adapted to the selected use. As shown in Figs. I and II, the side portion 8 is notched in its outer margin, is enlarged in thickness and rounded between said notches and is formed with a longitudinal bore between and intersected by said notches to receive and carry a rod or hinge pin 10, which hinge pin supports one end each of gripping members 9, of any desired number, and also provides means for articulation of the side portions. The side portion 7 is similarly enlarged, rounded and formed with a bore to receive another rod or hinge pin 10, the latter hinge pin being adapted to support and pivot an end portion of each of the gripping members 9 opposite to the first mentioned hinge pin 10. Each gripping member or tread member 9 is arcuate or curved laterally to conform to the transverse curvature of the tread of the tire 5 and extends at its respective ends into a notch of a side portion 7 or 8 and is formed with a hole to receive the rod or hinge pin 10. The gripping or tread devices or members preferably are made of tough cast metal designed to resist sudden shock and strain and, being separately mounted, can be removed, replaced and interchanged with others. Each gripping or tread member 9 is generally wedge-shaped in cross-section, the wedge outline having a blunt point or apex and an arcuate head (Fig. III), thus adapting the device to bite into the ground, grip the road-bed and increase the tractional effect and driving power of the wheel or wheels on which it is used. At the same time the radially inner surface of each member 9 bears on the tire surface with a minimum cutting, wearing or abrading influence.

The gripping device, as a composite thing, is applied to or removed from the wheel and tire, when the sleeve 14 is removed, by movement of the side portions 7 and 8 through arcs, they articulating on the rods or hinge pins 10. Small variations in transverse size of tires and fellies is compensated for by the tapering form of the arms or extensions 11, 12 and selective mounting of the sleeve 14 in respect of the length thereof when said arms are brought nearly or quite together. Thus a wider range of use is attained and convenience of applying and removal increased as compared with a threaded locking sleeve.

The size, weight and strength of the device would necessarily be dependent on the size of the wheel and type of car on which the same was intended to be used.

It will be noted that the device is small, light, and of simple construction, one which can be cheaply manufactured and quickly attached to the wheel when needed and quickly removed.

From the foregoing it would appear that the device might be attached to one driving wheel only, or a device provided for each of the driving wheels, or, if found necessary, more than one device attached to the same wheel.

It is moreover apparent that the device possesses many advantages for temporary or emergency purposes, for which use the same is intended, over the usual protective or anti-skidding devices in ordinary use, particularly in that because of the character and construction of the gripping members, it will give to the wheels far more tractional or driving power.

Furthermore, not being intended for permanent attachment, it will not produce the wear on the pneumatic tires occasioned by use of the customary anti-skidding chains.

What I claim is:

1. In a device of the class described, counterpart side portions formed with arms on end portions of their inner margins, said arms terminating in meeting flanges, said side portions being also formed with connecting means between and spaced from said flanges, and means for connecting outer margins of said side portions.

2. In a device of the class described, counterpart side portions, detachable means for locking them together and a plurality of inflexible arcuate tread members spaced relative to each other and pivoted at their ends to and connecting said side portions opposite to said locking means, whereby, when said detachable means is removed, either of said side portions may articulate on the pivotal connection between it and the arcuate tread members.

3. In a device of the class described, counterpart side portions, connecting means between and pivoted at each end to radially outer margins of said side portions, tapering, half-round arms on the radially inner margins of said side portions, a sleeve embracing said arms and adjustable longitudinally thereof and means for locking said sleeve and arms together.

MICHAEL ADAMSKI.

Witnesses:
EDWARD ADAMSKI,
FRANK W. KIRBY.